(12) United States Patent  
Reder

(10) Patent No.: US 9,383,586 B2
(45) Date of Patent: Jul. 5, 2016

(54) STEREOSCOPIC IMAGING SYSTEMS UTILIZING SOLID-STATE ILLUMINATION AND PASSIVE GLASSES

(75) Inventor: John Richard Reder, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 13/305,341

(22) Filed: Nov. 28, 2011

(65) Prior Publication Data

US 2012/0133649 A1    May 31, 2012

Related U.S. Application Data

(63) Continuation of application No. 11/616,140, filed on Dec. 26, 2006, now abandoned.

(51) Int. Cl.
*G06T 15/00* (2011.01)
*G02B 27/22* (2006.01)
*H04N 13/04* (2006.01)

(52) U.S. Cl.
CPC ........ *G02B 27/2207* (2013.01); *H04N 13/0431* (2013.01)

(58) Field of Classification Search
None
See application file for complete search history.

(56) References Cited

U.S. PATENT DOCUMENTS

| | | | |
|---|---|---|---|
| 5,629,798 A | 5/1997 | Gaudreau | |
| 7,564,509 B2 * | 7/2009 | Thomas | 349/30 |
| 7,629,400 B2 | 12/2009 | Hyman | |
| 7,697,750 B2 | 4/2010 | Simmons | |
| 7,832,869 B2 | 11/2010 | Maximus et al. | |
| 7,926,949 B1 | 4/2011 | Boothroyd | |
| 7,929,066 B2 | 4/2011 | Ezhov | |
| 2004/0108971 A1 | 6/2004 | Waldern et al. | |
| 2004/0263060 A1 | 12/2004 | Gilmour et al. | |
| 2005/0046700 A1 | 3/2005 | Bracke | |
| 2005/0083352 A1 * | 4/2005 | Higgins | 345/690 |
| 2005/0141076 A1 | 6/2005 | Bausenwein | |
| 2005/0243100 A1 * | 11/2005 | Childers | 345/589 |
| 2006/0145978 A1 * | 7/2006 | Takatori et al. | 345/87 |
| 2007/0132953 A1 * | 6/2007 | Silverstein | 353/7 |
| 2007/0247709 A1 * | 10/2007 | Karakawa | 359/464 |
| 2008/0151193 A1 | 6/2008 | Reder | |
| 2009/0086016 A1 | 4/2009 | Su | |
| 2009/0103178 A1 | 4/2009 | Woodgate et al. | |
| 2009/0185257 A1 * | 7/2009 | Maeda et al. | 359/290 |
| 2009/0190095 A1 | 7/2009 | Ellinger et al. | |

OTHER PUBLICATIONS

Christopher D. Wickens, Three-dimensional stereoscopic display implementation: Guidelines derived from human visual capabilities, SPIE vol. 1256 Stereoscopic Displays and Application, 1990.*
Barco Simulation, LLC; "Screen Independent Excellent Passive Stereo from One Single Projector"; Dec. 2006; www.barco.com/virtualreality; 4 pages.
Stefani, Oliver et al; "Low-loss Filter for Stereoscopic Projection with LCD Projectors"; www.coat-basel.com; 8 pages.

* cited by examiner

*Primary Examiner* — Kee M Tung
*Assistant Examiner* — Frank Chen
(74) *Attorney, Agent, or Firm* — Michael A. Davis, Jr.; Frank D. Cimino

(57) ABSTRACT

A stereoscopic display system employs narrowband illumination light beams and passive glasses with built-in interference filters. The system is also compatible with multiple viewing functions.

14 Claims, 7 Drawing Sheets

STEREOSCOPIC IMAGING SYSTEMS UTILIZING SOLID-STATE ILLUMINATION AND PASSIVE GLASSES

This application is a continuation of prior application Ser. No. 11/616,140, filed Dec. 26, 2006, the entirety of which is hereby incorporated by reference.

BACKGROUND

The technical field of the examples to be disclosed in the following sections relates to the art of display systems, and more particularly, to the field of stereoscopic imaging systems using solid-state illumination and passive glasses.

Traditional stereoscopic imaging systems for visualization of virtual objects use active shutter glasses and passive polarization glasses. Active shutter glasses incorporate left and right shutters that are synchronized to the sets of images for left and right eyes (left and right images). This approach, however, adds cost and introduces artificial effects, such as flickers as each side of the glasses turns on and off.

Passive glasses work in systems employing polarized light and incorporate left and right polarizers that are typically offset by 90° degrees. Due to the polarization, brightness and optical efficiency can be significantly reduced.

Therefore, there exists a need for cost effective displays capable of reproducing stereoscopic images with high brightness and optical efficiency.

SUMMARY

In an example, a method for stereoscopic imaging is disclosed. The method comprises: producing first and second light beams that are composed of different wavelengths, and in some embodiments also different numbers, of colors; modulating the first and second light beams based upon first and second sets of image data that are respectively derived from first and second sets of images; and passing the modulated first and second light beams through a pair of passive glasses with built-in first and second interference filters for viewing such that the modulated first light beam is passed substantially only through the first interference filter; and such that the modulated second light beam is passed substantially only through the second interference filter.

In another example, a system for use in producing a stereoscopic image is disclosed. The system comprises: an illumination system capable of producing first and second sets of light beams, wherein the wavelengths of light of the first set are substantially non-overlapping with the wavelengths of light of the second set, and wherein in some embodiments the first set of light beams comprises a different number of colors than the second set of light beams; a color processor capable of scaling the colors of the right and left images into a consistent and unique common color space; an image engine for reproducing a set of images derived from the stereoscopic image data by modulating the light beams based upon the scaled stereoscopic image data; and passive image viewing glasses with built-in interference filters for separating the set of images such that different right and left images of the image set can be viewed by different eyes of the viewer.

In yet another example, a method for imaging is disclosed. The method comprises: producing first and second narrowband light beams; modulating the first and second light beams based upon first and second sets of image data that are respectively derived from first and second sets of images; passing the modulated first and second light beams through a pair of passive glasses with built-in first and second interference filters for viewing such that the modulated first light beam passes substantially only through the first interference filter; and such that the modulated second light beam passes substantially only through the second interference filter; and delivering the reproduced first set of images to a first viewer, and the second set of images to the second viewer for viewing.

DETAILED DESCRIPTION OF SELECTED EXAMPLES

Examples disclosed herein illustrate a stereoscopic imaging system that uses illumination light with narrowband spectrum to generate stereoscopic images such that the generated images can be visualized using passive glasses, in particular, passive glasses integrated with interference filter technology (Infitech). By narrowband, it is meant that the full-width at half maximum (FWHM) of the light spectrum is 100 nm or less, more preferably 50 nm or less, and even 30 nm or less.

Figure 1:
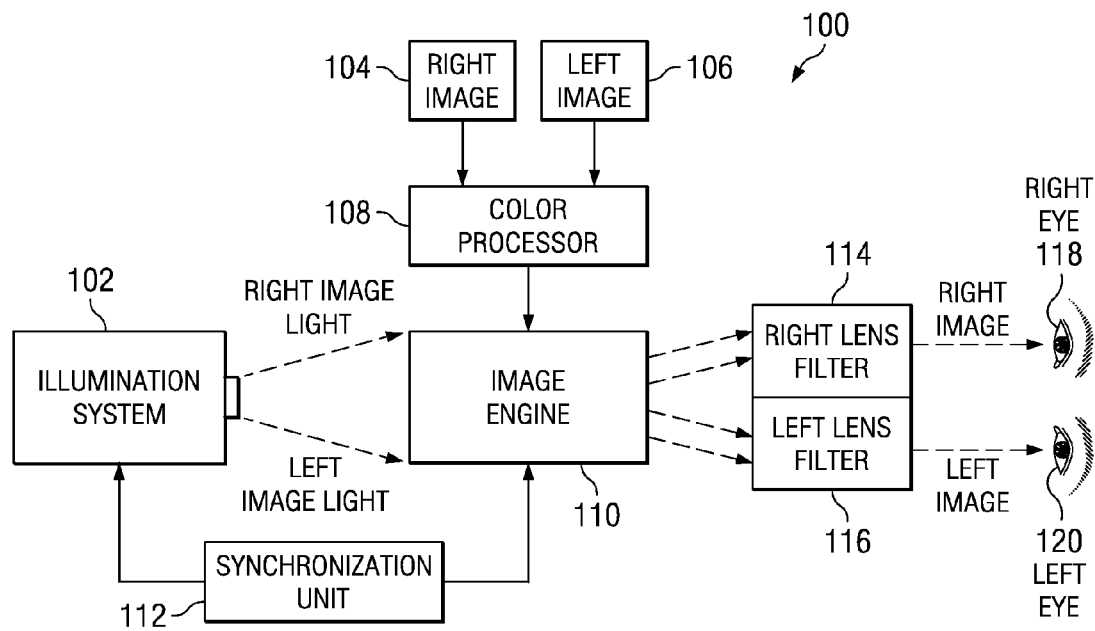
FIG. 1 is a diagram illustrating an example display system.

FIG. 1 schematically illustrates an example stereoscopic display system within the scope of the invention. Stereoscopic imaging system 100 in this particular example comprises illumination system 102, image engine 110, synchronization unit 112, color processor 108, right lens filter 114, and left lens filter 116.

Illumination system 102 emits narrowband illumination light beams with different waveband spectra. Subject to the constraint that the maximum number of allowable light beams with different waveband spectra is determined by the interference characteristics of the Infitech filter of the passive glasses, the number of light beams with different waveband spectra can be determined by the desired number of imaging channels with each channel transporting a sequence of images configured for a certain Infitech filter. As an example shown in the figure, dual imaging channels, i.e. right image light channel 104 and left image light channel 106, can be provided in compatibility with the right and left lens filters 114 and 116. Image information delivered by the right image processed light and passed through right lens filter 114 is collected by right eye 118 of the viewer; and image information delivered by the left image processed light and passed through left lens filter 116 is collected by left eye 120 of the viewer. In other alternatives, more than two imaging channels, and more than two separate illumination light beams with different waveband spectra can be provided, as further discussed later.

Figure 2:
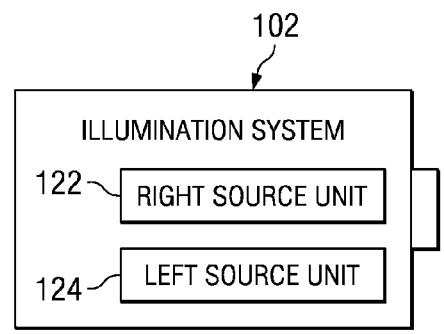
FIG. 2 is a block diagram showing an example structure of the illumination system in FIG. 1.

The illumination system may have one or multiple light source units for providing light beams of different spectra. An example is shown in FIG. 2. Referring to FIG. 2, illumination system 102 comprises right source unit 122 and left source unit 124 for providing illumination light beams for the right image and left image channels, respectively. In other alternatives, the illumination system may have any suitable number of light source units. Though not required, the solid-state light source units (e.g., 122 and 124) of the illumination system can be composed of solid-state light sources, such as lasers, LEDs, or any other suitable solid-state light sources capable of emitting narrowband light beams. Each light source unit preferably comprises light sources emitting a set of primary colors, such as red, green, and blue. For each color, there can be multiple light sources especially for rendering a desired waveband spectrum. For example, a set of light sources whose spectra are substantially around one of the primary colors (e.g., red) but are sequentially shifted a small amount (, 5 nm or less) can be used so as to obtain a desired bandwidth with a substantially flat top.

In an alternative configuration, the illumination system 102 may have one or more light sources not specifically designed for particular imaging channels. In this instance, for example when only one light source unit is provided, Infitech filters can be coupled to the light source unit so as to produce light beams with different (complementary) waveband spectra. The produced light beams can then be used to deliver image information to the viewer.

Referring again to FIG. 1, the illumination light beams from the illumination system 102 are directed to image engine 110. The image engine 110 can be any suitable device capable of reproducing images. For example, the image engine may comprise reflective and deflectable micromirror devices, liquid-crystal cells (LCD), or liquid crystal on silicon (LCOS) cells. Depending upon different optical configurations, the system can be front- or rear-projection systems or other display systems, such as back-lit displays.

The image engine 110 modulates the incident light beam (or multiple beams) based upon a set of image data derived from the corresponding images. For example, when right and left light beams are sequentially directed to the image engine, image data derived from right and left images 104 and 106 are sequentially delivered to the image engine through color processor 108 for modulating the incident light beams. The right and left images 104 and 106 can be generated by a separate module that is not shown in the figure.

To properly produce desired images, operations of the image engine, light sources of the illumination system, and feeding of the image data of right and left images are preferably synchronized. For example, during the time periods when right light source is turned on while the left light source is turned off, the right light beams illuminate the image engine. Image data of the right images are fed into the image engine. The image engine then modulates the incident right light beams based on the image data of the right images so as to properly reproduce right images. The reproduced right images are projected after the image engine (e.g., by projection lens) to the passive Infitech glasses. At the passive Infitech glasses, the right images carried by the right light beams are passed through the right lens filter 114 and stopped by the left lens filter 116. Accordingly, only right side eye 118 of the viewer receives right images.

At time periods when the right light source is turned off; and the left light source is turned on, left image data derived from the left images are delivered to the image engine that reproduces left images based on the left image data. The reproduced image data are then projected to the passive Infitech glasses (e.g., by projection lens) and pass through the left lens filter 116.

By sequentially turning on and off right and left light sources, and feeding image data of right and left images onto the image engine, reproduced right and left images can be sequentially delivered to right and left eyes 118 and 120, thus generating stereoscopic virtual objects. The above synchronization of the light sources, image feeding, and operation of the image engine can be accomplished by synchronization unit 112.

Other than sequentially reproducing right and left images as discussed above, right and left images can be simultaneously produced. In this example, multiple image engines are provided, as discussed later with reference to FIG. 10.

Figure 3A:
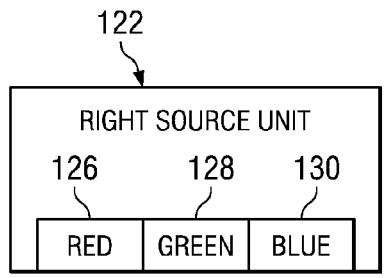
FIG. 3a illustrates an example structure of the right light source in FIG. 2.
Figure 3B:
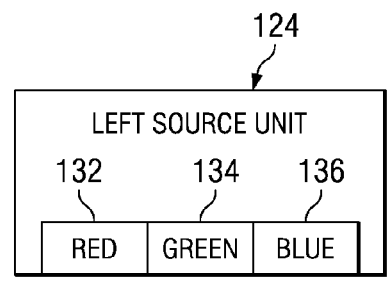
FIG. 3b illustrates an example structure of the left light source in FIG. 2.
Figure 4:
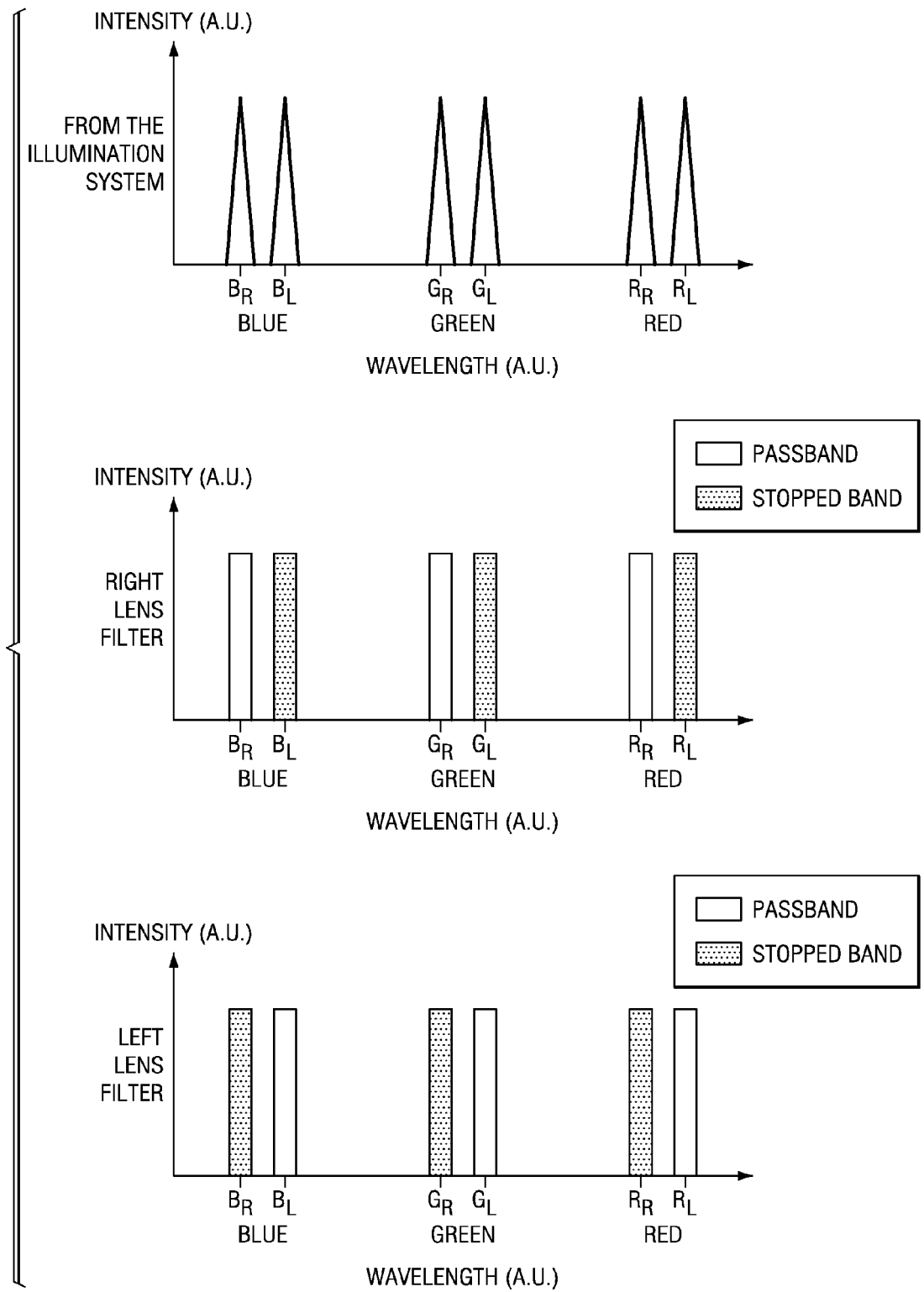
FIG. 4 illustrates an example stereoscopic imaging method using two primary color triplets generated by the illumination system of FIGS. 3a and 3b with each color triplet having red, green, and blue colors.

As an example, FIGS. 3*a*, 3*b* and 4 schematically illustrate example image channels of the display system in FIG. 1 for producing stereoscopic images. As shown in FIG. 3*a*, right light source unit 122 comprises light sources 126, 128 and 130 for producing narrowband primary colors red, green, and blue, respectively. Left light source unit 124 of FIG. 3*b* comprises light sources 132, 134, and 136 for producing another set of primary colors of red, green, and blue, respectively. It is noted that each color of each light source may have multiple light sources with identical spectrum or with small differences in spectra.

In the top view of FIG. 4, dual primary color triplets $B_R$-$G_R$-$R_R$ and $B_L$-$G_L$-$R_L$ for right and left imaging are illustrated. Each of the primary colors, red, green, and blue, comprises substantially non-overlapping wavebands for right and left imaging. Specifically, $B_R$ and $B_L$ lie in the blue color range; $G_R$ and $G_L$ lie in the green color range; and $R_R$ and $R_L$ lie in the red color range. Wavebands $B_R$, $G_R$, and $R_R$ form the color triplet for forming right images; and color wavebands $B_L$, $G_L$, and $R_L$ form the color triplet for forming left images. As can be seen, the wavelengths of the peaks of wavebands $B_R$, $G_R$, and $R_R$ are different than those of the wavebands $B_L$, $G_L$, and $R_L$.

The dual color triplets after the passive Infitech glasses are schematically illustrated in the middle and bottom views of FIG. 4. As shown in the middle view of FIG. 4, the color triplet $B_R$-$G_R$-$R_R$ for the right images is passed through the right lens filter (e.g., 114 in FIG. 1); and the color triplet $B_L$-$G_L$-$R_L$ for left images is stopped by the right lens filter. As a result, only the right images carried by the color triplet $B_R$-$G_R$-$R_R$ can arrive at the right eye of the viewer after the passive Infitech filter. As shown in the bottom view of FIG. 4, the color triplet $B_L$-$G_L$-$R_L$ for the left images is passed through the left Infitech filter but stopped by the right Infitech filter—resulting in only left images arriving at the left eye of the viewer. The left and right images are then integrated by the viewer's eyes so as to form the virtual stereoscopic object.

Figure 5:
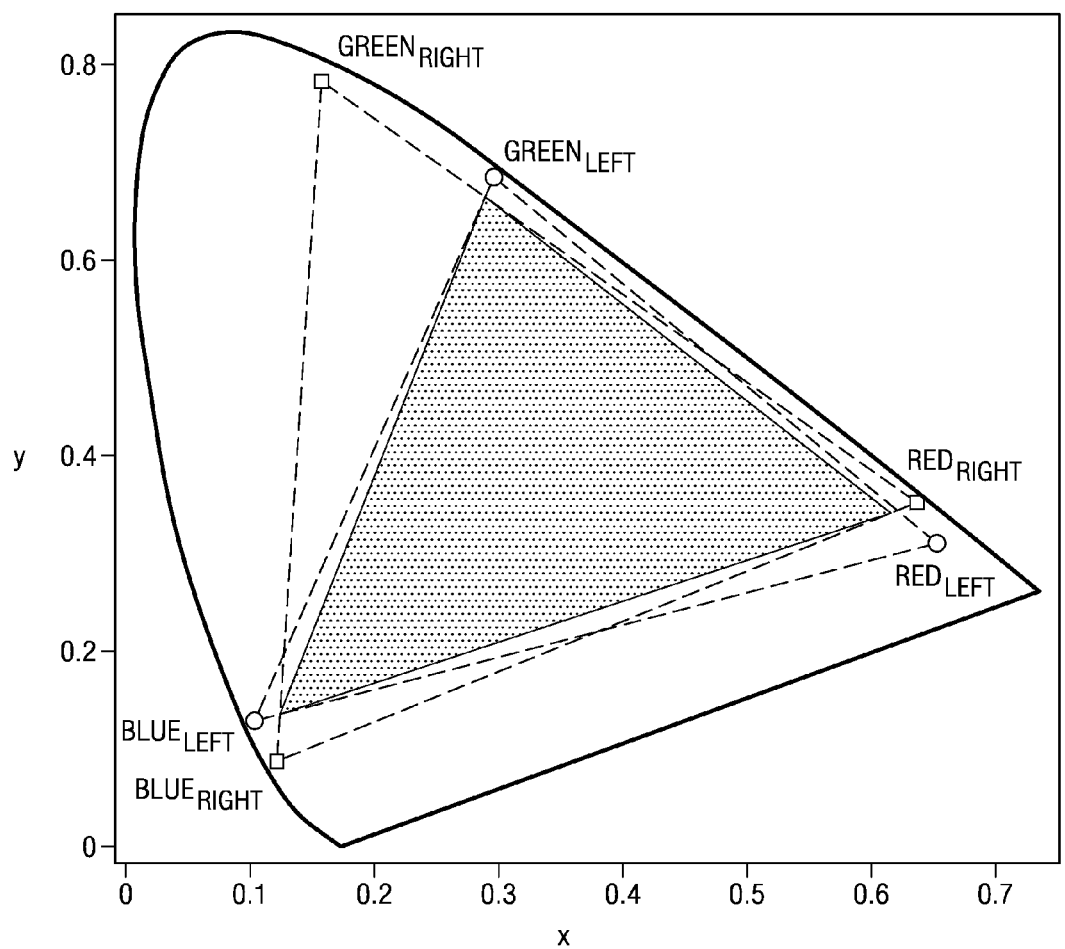
FIG. 5 illustrates the color space used in the imaging method illustrated in FIG. 4.

FIG. 5 schematically illustrates the color spaces in the color gamut. $Blue_{right}$, $Green_{right}$, and $Red_{right}$ represent the saturated colors of the color triplet $B_R$-$G_R$-$R_R$; and together define the color space for the right images, which is represented by the area surrounded by the larger dashed line triangle. $Blue_{left}$, $Green_{left}$, and $Red_{left}$ represent the saturated colors of the color triplet $B_L$-$G_L$-$R_L$; and together define the color space for the left images, which is represented by the area surrounded by the smaller dashed line triangle. The non-uniform color spaces for right and left images may cause annoying visual effects to the viewer, such as color displacement effects. In the example shown in FIG. 5, the right eye of the viewer may perceive right images as greenish; while the left eye may perceive left images as reddish or bluish. In order to maintain a consistent color space for the right and left images perceived by the viewers, a unique common color space is defined as illustrated in shaded area in FIG. 5. This unique color space is used for both right and left imaging. Input right and left color images are processed (e.g., by color processor 108 in FIG. 1) so as to scale the primary colors of the right and left images into the unique common color space by mixing colors. For example, the green color of the right images outside the shaded area can be mixed with an amount of blue and red colors. The red color of the left images when outside the shaded area can be mixed with an amount of green and blue colors.

Figure 6A:
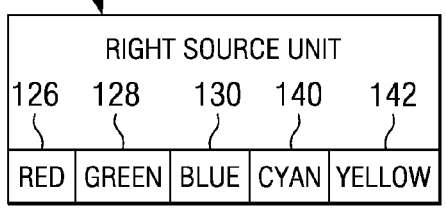
FIG. 6a illustrates another example structure of the right light source in FIG. 2.
Figure 6B:
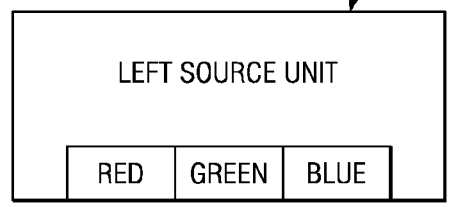
FIG. 6b illustrates another example structure of the left light source in FIG. 2.

As aforementioned, the illumination light beams may or may not have the same number of primary colors. In particular, a beam of illumination light can be a primary color triplet; whereas another beam of illumination light can be a color multiplet with more than three colors, such as a color tetrad or a color quintuplet. FIGS. 6a and 6b schematically illustrate such an example. Referring to FIG. 6a, right light source unit 138 of the illumination system 102 (in FIG. 1) may comprise light sources 126, 128, 130, 140, and 142 for emitting red, green, blue, cyan, and yellow colors. It is noted that cyan and yellow, or any one or more colors of red, green, and blue, in this example, can be replaced by other colors, such as white and magenta. Moreover, other colors, such as white and magenta, can be added to the right light source. Left light source unit 124 can be the same as that shown in FIG. 3b, which comprises light sources for red, green, and blue color. Of course, the right light source unit 138 may have a fewer number of light sources or the same number as that in FIG. 3a; while the left light source unit 124 may have a greater number of light sources.

Figure 7:
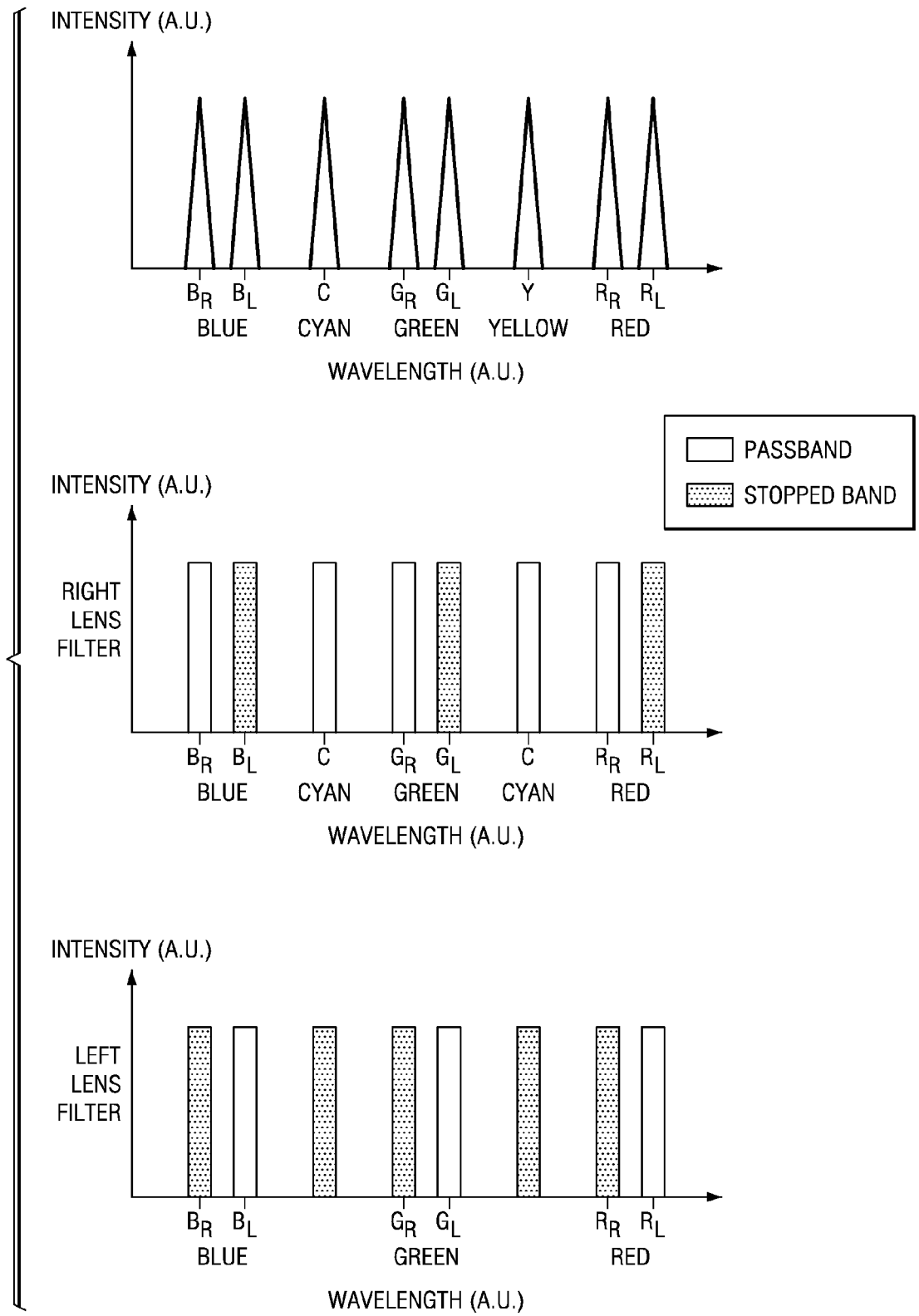
FIG. 7 illustrates an example stereoscopic imaging method using two primary color triplets generated by the illumination system of FIGS. 3a and 3b with a different numbers of primary colors for right and left eye imaging.

The spectra of the colors from the right and left light sources are schematically illustrated in the top view of FIG. 7. The top view in FIG. 7 illustrates the right color quintuplet $B_R$-C-$G_R$-Y-$R_R$ for right images and the left color triplet $B_L$-$G_L$-$R_L$ for left images. Additional colors cyan and yellow are added to enhance the color and whiteness of the perceived images. The cyan and yellow colors can be generated directly by right light sources, such as solid-state light sources, or can alternatively be produced by mixing colors from red, green, and blue colors ($B_R$, $G_R$, and $R_R$) of the right light sources.

As shown in the middle view of FIG. 7, $B_R$, C, $G_R$, Y, $R_R$ colors are passed through the right lens filter (e.g., 114 in FIG. 1) and the color triplet $B_L$-$G_L$-$R_L$ for left images are stopped by the right lens filter of the passive Infitech glasses. As a result, only the right images carried by the color quintuplet $B_R$, C, $G_R$, Y, and $R_R$ arrive at the right eye of the viewer after the passive Infitech filter. The color triplet $B_L$-$G_L$-$R_L$ for left images is passed through the left Infitech filter but stopped by the right Infitech filter—resulting in only left images arriving at the left eye of the viewer. The left and right images are then integrated by the viewer's eyes so as to form the virtual stereoscopic object.

Figure 8:
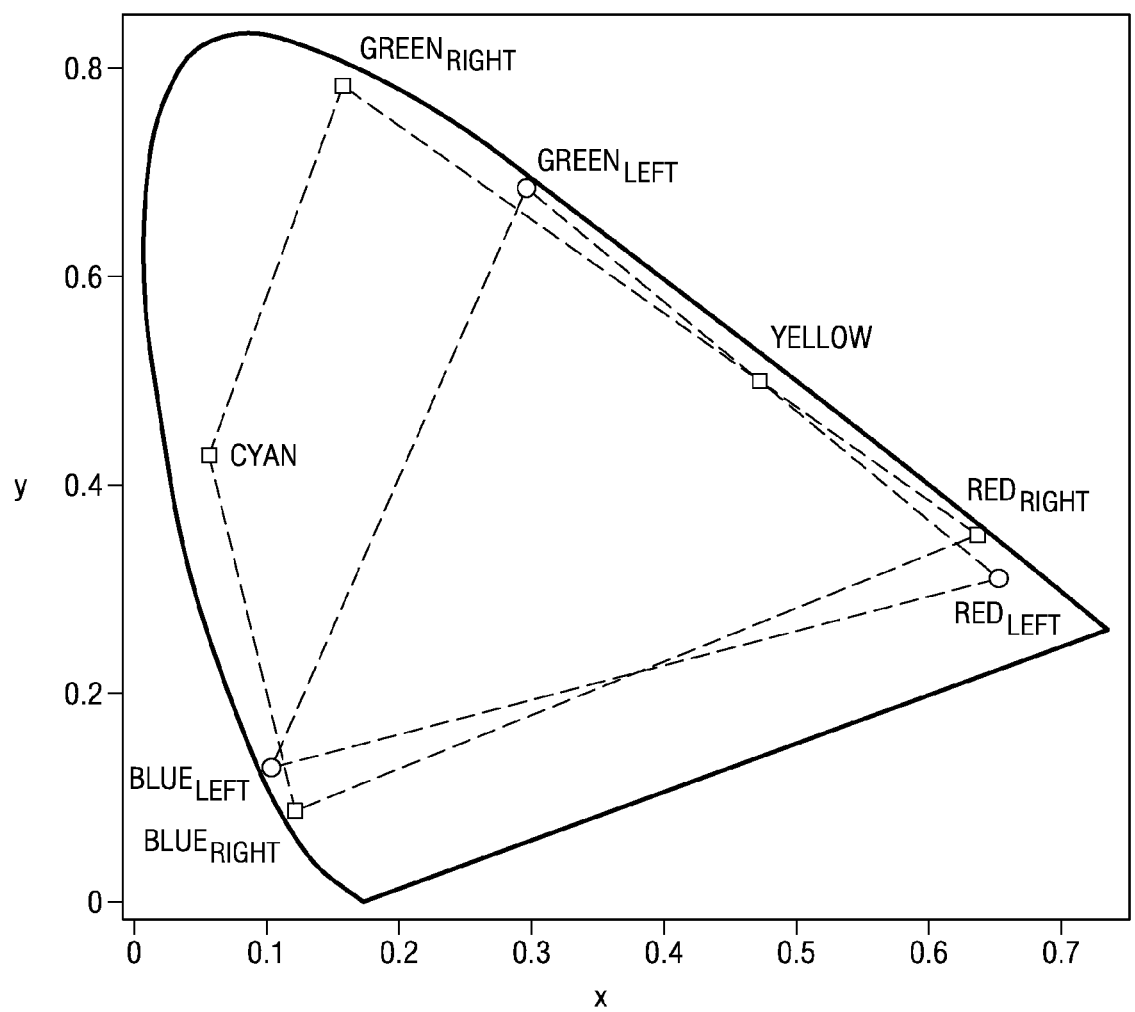
FIG. 8 illustrates the color space used in the imaging method illustrated in FIG. 7.

FIG. 8 is a chromaticity diagram schematically illustrating the color spaces of the quintuplet and triplet colors of FIGS. 6a and 6b. $Blue_{right}$, $Cyan_{Right}$, $Green_{right}$, $Yellow_{Right}$, and $Red_{right}$ represent the saturated colors of the color quintuplet $B_R$-C-$G_R$-Y-$R_R$; and together define the color space for the right images, which is represented by the area surrounded by the larger dashed line pentagon. $Blue_{left}$, $Green_{left}$, and $Red_{left}$ represent the saturated colors of the color triplet $B_L$-$G_L$-$R_L$; and together define the color space for the left images, which is represented by the area surrounded by smaller dashed line triangle. In order to maintain a consistent color space for the right and left images perceived by the viewers, a unique common color space can be defined for both right and left imaging. Input right and left color images are processed (e.g., by color processor 108 in FIG. 1) so as to scale the primary colors of the right and left images into the common color space by mixing colors.

Figure 9:
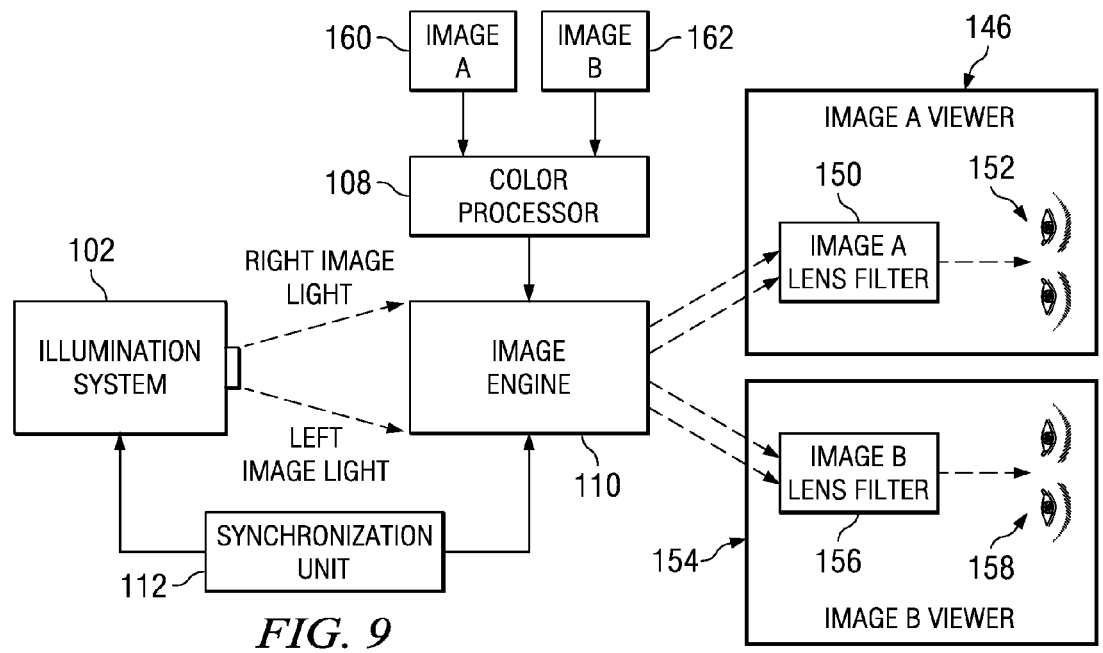
FIG. 9 illustrates yet another example stereoscopic display system of the invention which provides independent viewing experience for separate viewers.

The stereoscopic display systems as described herein are also compatible with multiple viewer function, as shown in FIG. 9. Specifically, the maximum number of different viewers simultaneously experiencing different image contents is determined by the characteristic interference spectrum of the passive Infitech filter and the narrowest characteristic bandwidths of the illumination light beams from the light sources. In this specific example, two imaging channels (corresponding to right and left illumination light beams) are provided by the light source. Accordingly, the system can provide two (though not necessarily) different sets of viewing contents to two viewers—image A viewer 146 and image B viewer 154. In operation, right illumination light carries image set A 160 and delivers image set A to eyes 152 (both right and left eyes) of viewer 146 through image A lens filter 150. Light illumination light carries image set B 162 and delivers image set B to eyes 158 (both right and left eyes) of viewer 154 through image B lens filter 156, as shown in FIG. 9. In this example, viewers 146 and 154 may not experience stereoscopic imaging. To provide stereoscopic viewing for different viewers (e.g., 146 and 154) with different contents simultaneously, multiple imaging channels are created, as shown in FIG. 10.

Figure 10:
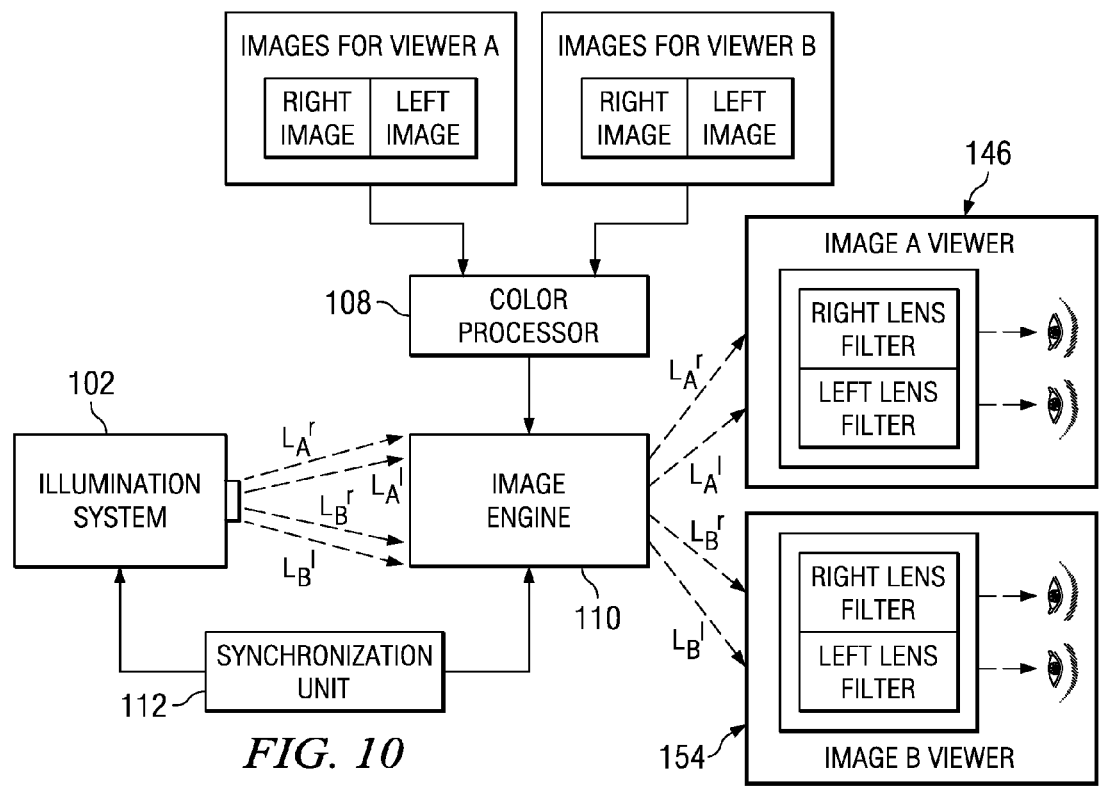
FIG. 10 illustrates yet another example stereoscopic display system of the invention which employs multiple image engines for generating stereoscopic images.

Referring to FIG. 10, the illumination system 102 provides multiple illumination light beams $L_A^r$, $L_A^l$, $L_B^r$, and $L_B^l$, with different wavelength spectra having substantially no overlapping therebetween. The light beams $L_A^r$, $L_A^l$, $L_B^r$, and $L_B^l$ respectively correspond to the characteristic interference spectra of right and left passive Infitech filters on different viewers 146 and 154. Specifically, light beams $L_A^r$ substantially only pass through the right lens filter of viewer 146; while light beams $L_A^l$ substantially only pass through the left lens filter of viewer 146. Light beams $L_B^r$ substantially only pass through the right lens filter of viewer 154; while light beams $L_B^l$ substantially only pass through the left lens filter of viewer 154. Image contents are divided into groups for different viewers; and the image contents for each viewer are divided into right and left images for left and right side eyes of the specific viewer.

In operation, the image engine 110 can modulate each of the light beams $L_A^r$, $L_A^l$, $L_B^r$, and $L_B^l$ sequentially in any desired orders, but is synchronized with the input images. For example, the image engine can reproduce right and left images for viewers 146 and then reproduce left and right images for viewer 154. In this specific operation, light beams $L_A^r$ and $L_A^l$ sequentially illuminate the image engine while synchronized by sequentially feeding the right and left images for viewer A 146 into the image engine, as discussed with reference to FIG. 1. The modulated illumination light carrying right and left image information for viewer 146 is projected to passive Infitech filters of viewer 146 wherein light beams $L_A^r$ and $L_A^l$ respectively separately pass through right and left lens filters of the viewer 146. After one or multiple frames of images for viewer A 146 are modulated and projected to viewer A, the image engine 110 can be operated to reproduce images for viewer B 154. During this time period, light beams $L_B^r$ and $L_B^l$ sequentially illuminate the image engine 110 while synchronized with the sequential feeding of the right and left images for viewer B 154 into the image engine. The modulated illumination light carrying right and left image information for viewer 154 is projected to passive Infitech filters of viewer 154 wherein light beams $L_B^r$ and $L_B^l$ separately pass respectively through right and left lens filters of the viewer 154. After modulating one or more frames of images for viewer B 154, the image engine can turn again to reproduce images for viewer A 146. The above process is repeated for reproducing images for both viewers.

In an alternative example, image engine 110 can be operated to reproduce right (or left) images for the right (or left) eye of viewer 146 followed by reproducing images for right (or left) images for right (or left) side eye of the different viewer 154. Of course, other than a single image engine 110, the stereoscopic system can employ multiple image engines for reproducing images for separate viewers (or the same viewer). For example, the image engine 110 in FIG. 10 can be assigned to reproduce images for viewer A 146. Another image engine (not shown in the figure) can be provided to reproduce images for viewer 154. In this example, illumination light beams $L_A^r$ and $L_A^l$ preferably illuminate only the image engine designated to reproduce images for viewer A; and illumination light beams $L_B^r$ and $L_B^l$ preferably illuminate only the image engine designated to reproduce images for viewer B.

In yet another example, multiple image engines are provided with each image engine being assigned to reproduce only a portion of the images for both viewers A and B. For example, an image engine can be assigned to reproduce right images for right eyes of both viewers 146 and 154; while another image engine can be assigned to reproduce left images for left eyes of both viewers 146 and 154.

Figure 11:
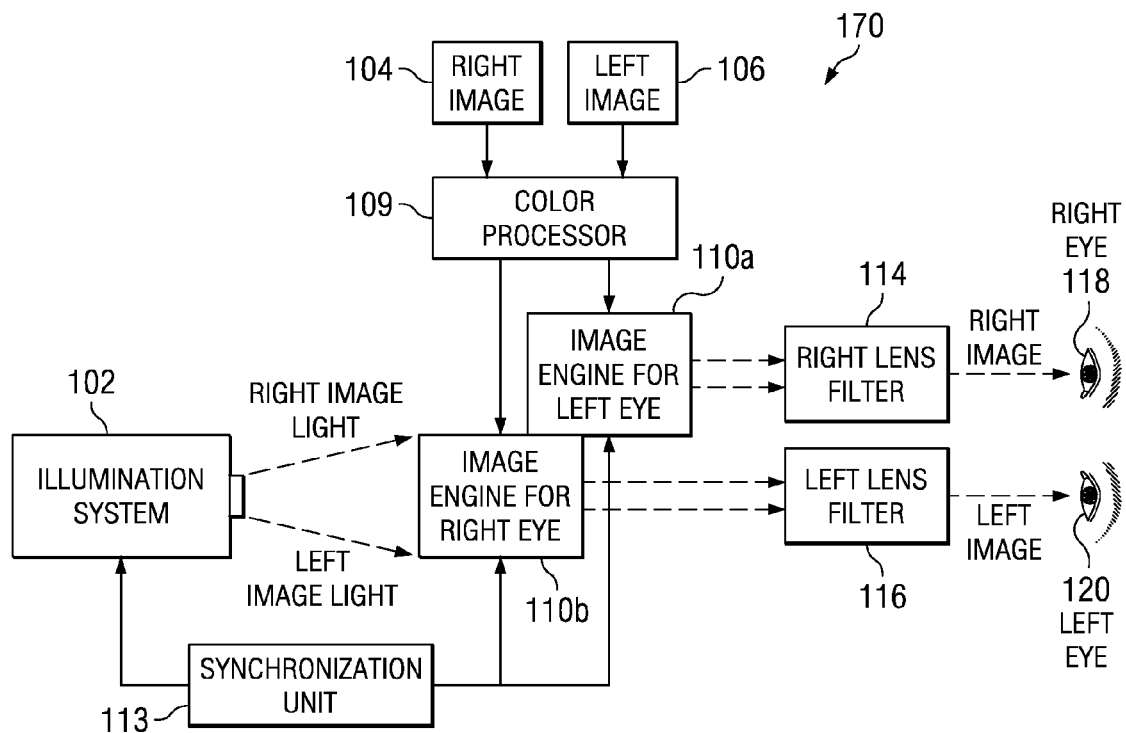
FIG. 11 illustrates yet another example stereoscopic display system of the invention which employs multiple image engines for generating stereoscopic images.

Even for one viewer, provision of multiple image engines in the system can be advantageous in imaging performance. An example of such system is schematically illustrated in FIG. 11. Referring to FIG. 11, image engines 110a and 110b are provided for respectively reproducing images for right and left eyes 118 and 120. For this purpose, right images to be reproduced for the right eye 118 of the viewer are delivered to image engine 110a; and left images to be reproduced for the left eye 120 of the viewer are delivered to image engine 110b. Operations of image engines 110a and 110b, feeding of the right and left images, and emitting of the illumination light from the illumination system can be synchronized by synchronization unit 112.

Figure 12:
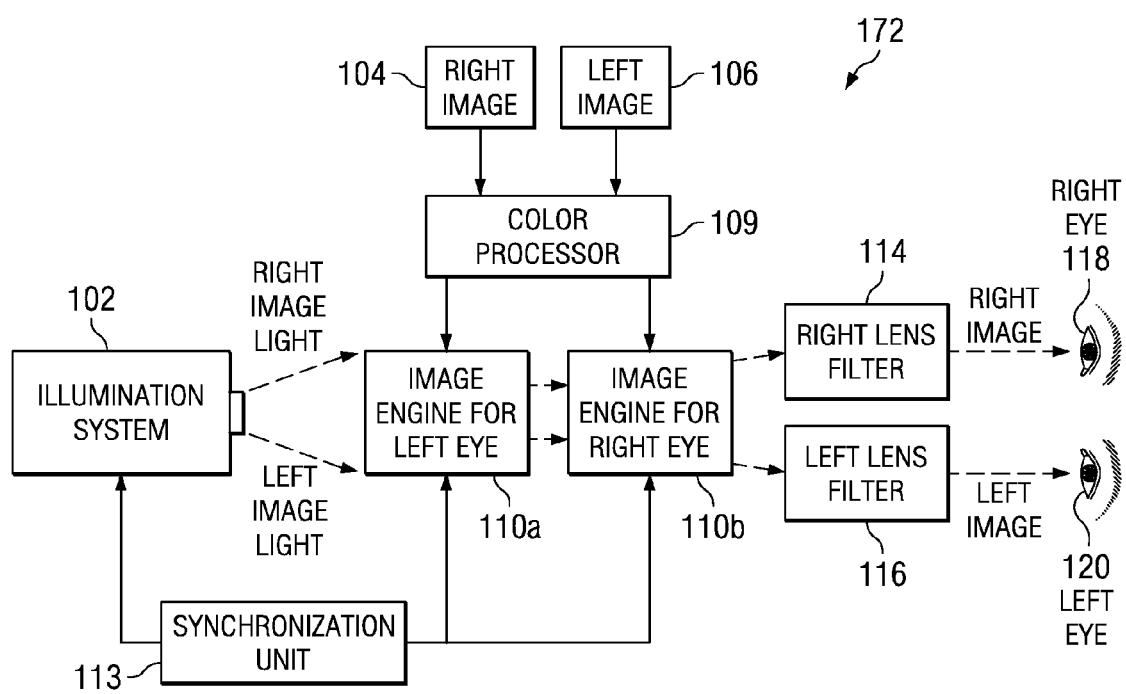
FIG. 12 illustrates yet another example stereoscopic display system of the invention which employs multiple image engines for generating stereoscopic images.

Instead of juxtaposing multiple image engines 102a and 102b in parallel on the optical path of the display system for independently reproducing images, the multiple image engines can be serially disposed on the optical path of the system, as shown in FIG. 12. This configuration can be of importance in obtaining high dynamic range (e.g., 2000:1 or higher, or 10,000:1 or higher) and high resolution. Referring to FIG. 12, image engine 110a is disposed in front of image engine 110b on the optical path of the system. The two image engines may or may not have the same resolution or same type of physical pixels. For example, one of the image engines may be composed of micromirrors whereas the other one can be composed of LCD cells, LCOS cells, or plasma cells. The front side image engine is designated to project images onto the rear side image engine. As a result, the contrast ratio of each pixel of the reproduced image (perceived by the viewer's eyes) is a product of the natural contrast ratios of the two image engines. By offsetting the pixel arrays of image engines 110a and 110b a small distance, for example half the pixel size of the image engine along the diagonal of the pixel array, the perceived resolution of the reproduced images can be approximately quadrupled. Operations of the image engines 110a and 110b can be synchronized to the illumination system 102 and feeding of the right and left images by synchronization unit 112, as shown in FIG. 12.

It will be appreciated by those of skill in the art that a new and useful stereoscopic display system and a method for producing stereoscopic virtual objects using the same have been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

What is claimed is:

1. A method for stereoscopic imaging, comprising:
processing input right and left image data to scale colors of right and left color spaces into a common color space, the right and left color spaces being defined by colors of first and second light wavelength spectra having different wavelength peaks within the same color range;
modulating a first image engine with the processed right image data in synchronism with illuminating the image engine with light having the first light wavelength spectrum to produce a right image; and
modulating a second image engine with the processed left image data in synchronism with illuminating the image engine with light having the second light wavelength spectrum to produce a left image;
wherein the first image engine is illuminated with light of the first light wavelength spectrum by a first narrowband light source unit, and the second image engine is illuminated with light of the second light wavelength spectrum by a second narrowband light source unit;
wherein the processed right image data and the processed left image data are sequentially delivered to the first image engine and to the second image engine, respectively; and
wherein the produced right and left images are viewable with viewing glasses having: a right lens filter which passes light of the first light wavelength spectrum, but blocks light of the second light wavelength spectrum; and a left lens filter which passes light of the second light wavelength spectrum, but blocks light of the first light wavelength spectrum.

2. The method of claim 1, wherein the first image engine is alternately illuminated with light having the first light wavelength spectrum, and the second image engine is alternately illuminated with light having the second light wavelength spectrum in synchronism with sequential alternate delivery of the processed right image data and the processed left image data.

3. The method of claim 2, wherein the first and second image engines each comprise at least one spatial light modulator having individually settable light-reflecting pixel elements.

4. The method of claim 3, wherein the pixel elements are micromirrors.

5. The method of claim 3, wherein the first image engine comprises a single spatial light modulator alternately illuminated with light having the first light wavelength spectrum, and the second image engine comprises another single spatial light modulator alternately illuminated with light having the second light wavelength spectrum.

6. The method of claim 3, wherein the first and second light wavelength spectra are non-overlapping.

7. The method of claim 1, wherein the first and second narrowband light source units comprise light source units emitting respective sets of different wavelength distributions of primary colors.

8. The method of claim 7, wherein: the first narrowband light source unit includes a first red light source unit, a first blue light source unit and a first green light source unit and the second narrowband light source unit includes a second red light source unit, a second blue light source unit and a second green light source unit; and the first red light source unit emits a red color with a different wavelength peak than the second red light source unit, the first blue light source unit emits a blue color with a different wavelength peak that the second blue light source unit, and the first green light source unit emits a green color with a different wavelength peak than the second green light source unit.

9. The method of claim 7, wherein the right and left color spaces are defined by representations of the saturated colors of the respective sets of different wavelength primary colors.

10. The method of claim 9, wherein the respective sets of different wavelength primary colors have the same number of primary colors.

11. The method of claim 9, wherein the respective sets of different wavelength primary colors have a different number of primary colors.

12. A method for stereoscopic imaging, comprising:
processing input right and left image data to scale colors of right and left color spaces into a common color space, the right and left color spaces being defined by saturations of first, second and third primary colors of first and second light wavelength spectra having different wavelength peaks for each of the first, second and third primary colors;
alternately illuminating, with a first illumination source unit having a narrowband light source for each of the first, second and third primary colors, a first image engine with light having the first light wavelength spectrum and illuminating, with a second illumination source unit having a narrowband light source for each of the first, second and third primary colors, a second image engine with light having the second light wavelength spectrum; and
alternately modulating the first image engine with the processed right image data and modulating the second image engine with the processed left image data in synchronism with the alternate illumination, to produce alternate right and left images, respectively viewable by right and left lenses of glasses having: a right lens filter which passes light of the first light wavelength spectrum but blocks light of the second light wavelength spectrum; and a left lens filter which passes light of the second light wavelength spectrum, but blocks light of the first light wavelength spectrum;
wherein the processed right image data and the processed left image data are sequentially delivered to the first image engine and to the second image engine, respectively.

13. The method of claim 12, wherein the first, second and third primary colors of the first and second light wavelength spectra comprise different wavelength bands of red, green and blue colors, respectively.

14. The method of claim 12, wherein the first light wavelength spectrum comprises at least one additional primary color not included in the second light wavelength spectrum.

* * * * *